United States Patent
Watanabe et al.

(10) Patent No.: US 12,427,566 B2
(45) Date of Patent: Sep. 30, 2025

(54) ADDITIVELY MANUFACTURED CERAMIC CORE AND MANUFACTURING METHOD FOR THE CERAMIC CORE

(71) Applicant: Noritake Co., Limited, Nagoya (JP)

(72) Inventors: Hirokazu Watanabe, Nagoya (JP); Akihiro Kawahara, Nagoya (JP); Tsuyoshi Hondo, Nagoya (JP); Kouji Inukai, Nagoya (JP); Shinji Kato, Nagoya (JP)

(73) Assignee: Noritake Co., Limited (JP)

( * ) Notice: Subject to any disclaimer, the term of this patent is extended or adjusted under 35 U.S.C. 154(b) by 393 days.

(21) Appl. No.: 18/038,026

(22) PCT Filed: Nov. 12, 2021

(86) PCT No.: PCT/JP2021/041691
§ 371 (c)(1),
(2) Date: May 22, 2023

(87) PCT Pub. No.: WO2022/107691
PCT Pub. Date: May 27, 2022

(65) Prior Publication Data
US 2024/0001436 A1    Jan. 4, 2024

(30) Foreign Application Priority Data
Nov. 20, 2020    (JP) ................. 2020-193179

(51) Int. Cl.
*B22C 9/10*    (2006.01)
*B28B 1/00*    (2006.01)
(Continued)

(52) U.S. Cl.
CPC ............... *B22C 9/10* (2013.01); *B28B 1/001* (2013.01); *B33Y 10/00* (2014.12); *B33Y 80/00* (2014.12)

(58) Field of Classification Search
CPC ............ B22C 9/10; B33Y 10/00; B33Y 80/00
See application file for complete search history.

(56) References Cited

U.S. PATENT DOCUMENTS

| 2015/0306657 A1 | 10/2015 | Frank |
| 2016/0354836 A1 | 12/2016 | Oguma et al. |

(Continued)

FOREIGN PATENT DOCUMENTS

| CN | 107866524 | 4/2018 |
| DE | 102018221826 | 6/2019 |

(Continued)

OTHER PUBLICATIONS

European Patent Office, extended European search report (including Annex dated Jun. 30, 2025), Application No. 21894565.7-1103 / 4223472 PCT/JP2021041691, Jul. 11, 2025, 11 pages.

*Primary Examiner* — Kevin E Yoon
(74) *Attorney, Agent, or Firm* — Gerald W. Roberts; John V. Daniluck; Dentons Bingham Greenebaum LLP

(57) ABSTRACT

According to the present invention, an additively manufactured ceramic core having both strength and collapsibility, and meltability and moreover having surface roughness improved is provided. The additively manufactured ceramic core disclosed herein is an additively manufactured ceramic core to be used as a core when manufacturing a metal casting and includes a central part corresponding to an additively manufactured fired body of a predetermined ceramic powder, a first layer covering at least a part of the central part, and a second layer formed on a surface layer of the first layer. When an average erosion rate corresponding to an average value of erosion rates calculated from an expression: erosion rate ($\mu m/g$)=B/A in which A g represents a projection quantity of projection particles and B $\mu m$ represents an erosion depth in a fragility test is used, the average erosion rate of the first layer is lower than that of the central (Continued)

500μm part and the average erosion rate of the second layer is higher than that of the first layer. The second layer has a surface roughness Ra of 10 μm or less.

16 Claims, 3 Drawing Sheets

(51) Int. Cl.
  *B33Y 10/00* (2015.01)
  *B33Y 80/00* (2015.01)

(56) References Cited

U.S. PATENT DOCUMENTS

| | | |
|---|---|---|
| 2017/0028461 A1 | 2/2017 | Fujiwara et al. |
| 2018/0057411 A1 | 3/2018 | Yoshikawa et al. |

FOREIGN PATENT DOCUMENTS

| | | | |
|---|---|---|---|
| JP | 2013071169 A | * | 4/2013 |
| JP | 2015171724 | | 10/2015 |
| JP | 2015171725 | | 10/2015 |
| JP | 2016159324 | | 9/2016 |
| JP | 2018031050 | | 3/2018 |
| JP | 2020116884 | | 8/2020 |

* cited by examiner

500μm

500μm

ADDITIVELY MANUFACTURED CERAMIC CORE AND MANUFACTURING METHOD FOR THE CERAMIC CORE

CROSS-REFERENCE TO RELATED APPLICATION(S)

The present application claims the benefit of priority to Japanese Patent Application No. 2020-193179, filed Nov. 20, 2020, the entire disclosure of which is incorporated herein by reference.

TECHNICAL FIELD

The present invention relates to an additively manufactured ceramic core and a manufacturing method for the ceramic core.

BACKGROUND ART

In conventionally known additive manufacturing (also referred to as three-dimensional manufacturing), an object with a desired stereoscopic shape is manufactured in a manner that a powder body material is bonded with a binder to form a powder body solidified layer with a predetermined cross-sectional shape and this powder body solidified layer is formed while being sequentially stacked. In the recent additive manufacturing of a powder body material (powder additive manufacturing), a powder body material formed of a ceramic material, which is not easily processed precisely after the manufacturing, has also been widely used. By such powder additive manufacturing, a ceramic core to be used as a core when a metal casting with a complicated shape is formed can be manufactured at low cost and in a short time.

Characteristics necessary for such a ceramic core generally include the strength that can resist molten metal at about 1500° C. when the molten metal is poured, and the surface roughness enough to make a casting surface to be manufactured smooth. When the molten metal thermally shrinks in a process of solidifying, the ceramic core needs to have the collapsibility that does not cause a recrystallization failure. When the ceramic core is removed from the metal casting, the ceramic core needs to be meltable so as to be easily removed by an alkaline solution.

In order to obtain the balanced characteristics of the ceramic core, various suggestions have been made conventionally, some examples of which are shown in Patent Literatures 1 to 3. Patent Literatures 1 and 2 disclose techniques for improving the strength of a casting mold. Patent Literature 1 describes the technique of forming an additively manufactured object by coating a surface of a silica-containing powder with an organic binder and then firing the additively manufactured object. Patent Literature 2 describes the technique of impregnating an additively manufactured object with an inorganic binder a plurality of times and then firing the additively manufactured object. Patent Literature 3 discloses the technique of forming an object including a slurry layer and a stucco layer and then firing the object in order to achieve both the strength of a casting mold and self-collapsibility.

CITATION LIST

Patent Literatures

[Patent Literature 1] Japanese Patent Application No. 2015-171725
[Patent Literature 2] Japanese Patent Application No. 2016-159324
[Patent Literature 3] Japanese Patent Application No. 2015-171724

SUMMARY OF INVENTION

Technical Problem

Incidentally, an additively manufactured object formed of a powder body material including a ceramic material has larger spaces between particles than a ceramic molded body formed by using a mold, and therefore tends to have high porosity. In addition to this, such an additively manufactured object tends to have higher surface roughness (that is to say, the surface becomes rough) due to the uneven lamination caused when a powder material is laminated. The value of the surface roughness of the ceramic core is directly linked to the value of the surface roughness of the metal casting. In view of this, a technique of obtaining a ceramic core with improved surface roughness (that is, with a smooth surface) has been desired.

The present invention has been made in view of the above circumstances and a main object of the present invention is to provide an additively manufactured ceramic core having both strength and collapsibility, and meltability, and moreover having surface roughness improved. Another object is to provide a manufacturing method for such a ceramic core.

Solution to Problem

In order to achieve the aforementioned object, an additively manufactured ceramic core to be used as a core when manufacturing a metal casting is provided. That is to say, the additively manufactured ceramic core disclosed herein includes a central part corresponding to an additively manufactured fired body of a predetermined ceramic powder, a first layer covering at least a part of the central part, and a second layer formed on a surface layer of the first layer. Here, when an average erosion rate corresponding to an average value of erosion rates calculated from an expression: erosion rate $(\mu m/g) = B/A$ in which A g represents a projection quantity of projection particles and B $\mu m$ represents an erosion depth in a fragility test is used, the average erosion rate of the first layer is lower than that of the central part and the average erosion rate of the second layer is higher than that of the first layer.

By such a structure, the additively manufactured ceramic core having both strength and collapsibility and moreover having the surface roughness improved can be achieved.

In a preferred embodiment of the ceramic core disclosed herein, the average erosion rate of the central part is 5 times or more that of the first layer, and the average erosion rate of the second layer is 2.5 times or more that of the first layer.

With the average erosion rate in this range, the additively manufactured ceramic core having both the strength and the collapsibility at a higher level can be achieved.

In a preferred embodiment of the ceramic core disclosed herein, the second layer has an arithmetic average surface roughness Ra of 10 $\mu m$ or less.

Such a ceramic core can have the surface roughness enough to make the metal casting have a smooth surface.

In a preferred embodiment of the ceramic core disclosed herein, each of the central part and the second layer includes at least one kind selected from the group consisting of silica, alumina, zircon, and magnesia.

By the use of an oxide containing such a metal element or metalloid element, the aforementioned effect can be exerted more suitably.

In a preferred embodiment of the ceramic core disclosed herein, the first layer contains silica as a main component.

By such a structure containing silica as the highest content component, the ceramic core that can be easily melted and removed by an alkaline solution is provided.

In order to achieve the other object, a manufacturing method for an additively manufactured ceramic core is provided. That is to say, the manufacturing method disclosed herein includes manufacturing an additively manufactured object by an additive manufacturing method using a first ceramic powder with an average particle diameter D1, obtaining the central part corresponding to an additively manufactured fired body by firing the additively manufactured object, forming the first layer on at least a part of the additively manufactured fired body by immersing the additively manufactured fired body in a ceramic sol including a second ceramic with an average particle diameter D2, and forming the second layer on a surface layer of the first layer by immersing the additively manufactured fired body with the first layer formed thereon in a ceramic slurry including a third ceramic powder with an average particle diameter D3.

By the manufacturing method according to this aspect, the additively manufactured ceramic core having both the strength and the collapsibility and moreover having the surface roughness improved can be manufactured.

In a preferred aspect of the manufacturing method for a ceramic core disclosed herein, the average particle diameters D1, D2, and D3 of the first ceramic powder, the second ceramic powder, and the third ceramic powder satisfy D1>D3>D2.

By such a structure, the ceramic core having both suitable strength and collapsibility and moreover having the surface roughness improved can be manufactured.

In a preferred aspect of the manufacturing method for a ceramic core disclosed herein, the second layer has an arithmetic average surface roughness Ra of 10 μm or less.

A ceramic core manufactured by the manufacturing method according to this aspect has the surface roughness enough to make the metal casting have a smooth surface.

In a preferred aspect of the manufacturing method for a ceramic core disclosed herein, each of the first ceramic powder and the third ceramic powder includes at least one kind selected from the group consisting of silica, alumina, zircon, and magnesia.

In a preferred aspect of the manufacturing method for a ceramic core disclosed herein, the second ceramic powder contains silica as a main component.

By such a structure, the aforementioned effect can be exerted more suitably.

DESCRIPTION OF EMBODIMENTS

Figure 1:
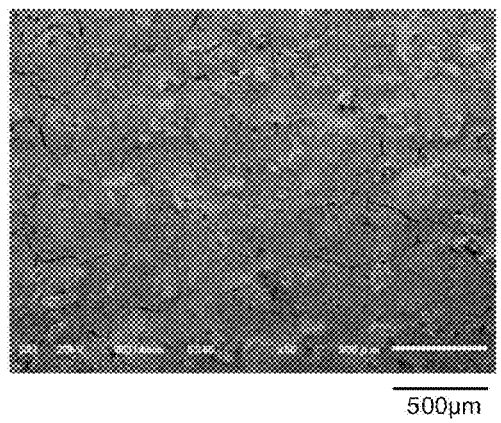
FIG. 1 shows a SEM observation image of a surface in Example 1.

Preferred embodiments of the present invention will be described below. Incidentally, matters other than matters particularly mentioned in the present specification and necessary for the implementation of the present invention can be grasped as design matters of those skilled in the art based on the prior art in the relevant field. The present invention can be carried out based on the contents disclosed in this specification and technical common sense in the field.

In the present specification, regarding compositions of a first layer and first to third ceramic powders, "containing A as a main component" may correspond to containing A as the highest content component in the first layer and the first to third ceramic powders. Containing A as the highest content component may mean, without particular limitations, that the ratio of A in the first layer and the first to third ceramic powders is typically 60% or more (preferably 70% or more, more preferably 80% or more, still more preferably 90% or more, and for example 99% or more) on the mass basis, for example. Configuring the whole (100%) with A on the mass basis can also be included.

An additively manufactured ceramic core disclosed herein includes a central part, a first layer, and a second layer. The central part is an additively manufactured fired body with a porous structure formed by manufacturing and firing the first ceramic powder through additive manufacturing. The first layer is a layer including the second ceramic powder and covering at least a part of the central part. The first layer is formed by immersing the central part in a dispersion liquid (ceramic sol) including the second ceramic powder and a dispersion medium, and removing the dispersion medium by drying and heating. The second layer is a porous layer including the third ceramic powder and formed on a surface layer of the first layer. The second layer is formed by coating the surface layer of the first layer with a ceramic slurry including the third ceramic powder and a solvent, and removing the solvent by firing at high temperature.

In the additively manufactured ceramic core disclosed herein, the average erosion rate of the first layer is lower than that of the central part, and the average erosion rate of the second layer is higher than that of the first layer. These average erosion rates can be measured and calculated by using a commercial device. For example, as this kind of device, a device manufactured by Palmeso Co., Ltd. (for example, MSE-A203 or the like) can be used to perform a fragility test for the additively manufactured ceramic core. Thus, the average erosion rate of each structure of the additively manufactured ceramic core is calculated. Specifically, a test piece of the additively manufactured ceramic core with a substantially rectangular parallelepiped shape including the central part, the first layer, and the second layer and a test piece (cross section) obtained by cutting the test piece along a width direction at a position 4 mm from a surface of the test piece along a thickness direction are prepared. The surfaces of the test piece and the test piece (cross section) are irradiated with a predetermined quantity of projection particles (for example, 3-μm spherical alumina MSE-BA-3-3 manufactured by Palmeso Co., Ltd. or the like) with a projection output value at which the projection particles have a predetermined erosion rate (for example, 0.18 μm/g) to a standard test piece (for example, HRC-45 manufactured by Pahneso Co., Ltd. or the like). The test piece and the test piece (cross section) are ground to a depth of 180 μm from the surface in the thickness direction. The relation between the projection quantity (A g) of the projection particles and the depth of the erosion (B μm) is acquired successively (in at least three or more places, and moreover, 10 or more places). Thus, a graph (erosion progress graph) expressing the relation between the projection quantity (A g) of the projection particles and the depth of the erosion (B μm) can be obtained. The erosion rate is a value calculated based on A and B described above in accordance with the expression: erosion rate (μm/g)=B/A. By plotting the changes of the erosion rates at the respective depths from the surface with respect to the depth of the erosion in at least three or more places and moreover 10 or more places, the erosion rate distribution from the surface in the thickness direction can be obtained. Note that the erosion rate is a parameter expressing the erosion speed (how easily the erosion occurs), and the smaller numeral means the harder test piece.

In the plotted erosion rate distribution, the value from the surface of the test piece (0 μm) to 60 μm is the erosion rate corresponding to the second layer, the value from 100 μm to 180 μm is the erosion rate corresponding to the first layer, and the value from the surface (0 μm) of the test piece (cross section) to 180 μm is the erosion rate corresponding to the central part. For each structure, the average value of the erosion rates in the three or more places (moreover, 10 or more places) is calculated and this value is defined as the average erosion rate of each structure.

The average erosion rates of the central part, the first layer, and the second layer can be obtained as described above. In the additively manufactured ceramic core disclosed herein, the average erosion rate of the first layer is lower than that of the central part, and the average erosion rate of the second layer is higher than that of the first layer; thus, a certain degree of strength and collapsibility required in the use as the ceramic core can be secured.

The average erosion rate of the central part is required to be higher than that of the first layer. The average erosion rate of the central part is preferably about 5 times or more and 10 times or less, more preferably 5.5 times or more and 9.5 times or less, and still more preferably 6 times or more and 9 times or less the average erosion rate of the first layer. The average erosion rate of the second layer is required to be higher than that of the first layer. The average erosion rate of the second layer is preferably about 2.5 times or more and 8.5 times or less, more preferably 3 times or more and 8 times or less, and still more preferably 3.5 times or more and 7.5 times or less the average erosion rate of the first layer. The art disclosed herein may be suitably carried out in an aspect with the average erosion rate in the aforementioned range.

The first to third ceramic powders, which are used in the central part, the first layer, and the second layer, are different from each other in average particle diameter (D1 to D3). The average particle diameters of the ceramic powders satisfy D1>D3>D2. By the use of such ceramic powders with the different average particle diameters for the respective structures, the additively manufactured ceramic core having both the strength and the collapsibility and the surface roughness improved can be achieved.

The term "average particle diameter" about the first ceramic powder and the third ceramic powder refers to the particle diameter at a cumulative value 50% (50% volume average particle diameter, D50) in the particle size distribution based on volume, which is measured by a particle size distribution measurement device based on a laser scattering and diffraction method, unless otherwise stated.

The term "average particle diameter" about the second ceramic powder refers to the average particle diameter calculated from the specific surface area of the second ceramic powder obtained by a BET method (for example, one point method for BET method) or the like unless otherwise stated. This average particle diameter is a value calculated on the premise that the primary particle diameter of the second ceramic powder coincides with the diameter (sphere equivalent diameter) of a spherical particle that can achieve the specific surface area. This average particle diameter D2 can be obtained based on the expression $D2=6/(\rho S)$ in which S represents the specific surface area of the second ceramic powder and ρ represents the density of the second ceramic powder, for example.

The average particle diameter D1 of the first ceramic powder used here is required to be larger than the average particle diameter D2 of the second ceramic powder and the average particle diameter D3 of the third ceramic powder. The average particle diameter D1 of the first ceramic powder is not limited in particular and is for example 20 μm or more, preferably 25 μm or more, and more preferably 30 μm or more. On the other hand, too coarse ceramic particles are not preferable because such ceramic particles can deteriorate the manufacturing accuracy of the ceramic core. Therefore, D1 may be for example 100 μm or less, more preferably 80 μm or less, and still more preferably 60 μm or less. The average particle diameter D1 of the first ceramic powder may be 20 μm or more and 100 μm or less, for example. By the use of the first ceramic powder with the average particle diameter D1 as described above, the central part having both the strength and the suitable collapsibility can be obtained, for example.

The average particle diameter D2 of the second ceramic powder used here is required to be smaller than the average particle diameter D1 of the first ceramic powder and the average particle diameter D3 of the third ceramic powder. The average particle diameter D2 of the second ceramic powder is not limited in particular and is for example 25 nm or less, preferably 20 nm or less, and more preferably 15 nm or less. The lower limit of the average particle diameter D2 of the second ceramic powder is not limited in particular and the average particle diameter D2 can be for example 1 nm or more, and typically 5 nm or more. The average particle diameter D2 of the second ceramic powder may be, for example, 1 nm or more and 25 nm or less. By the use of the second ceramic powder with the average particle diameter D2 as described above, for example, the second ceramic powder can be disposed in the gap in the first ceramic powder more suitably to increase the strength of the ceramic core.

The average particle diameter D3 of the third ceramic powder used here is required to be smaller than the average particle diameter D1 of the first ceramic powder and larger than the average particle diameter D2 of the second ceramic powder. The average particle diameter D3 of the third ceramic powder is not limited in particular and is for example 15 μm or less and preferably 10 μm or less. The lower limit of the average particle diameter D3 of the third ceramic powder is not limited in particular and the average particle diameter D3 is for example 0.5 µm or more and preferably 1 µm or more typically. The average particle diameter D3 of the third ceramic powder may be, for example, 0.5 µm or more and 15 µm or less. By the use of the third ceramic powder with the average particle diameter D3 as described above, for example, when a ceramic slurry including the third ceramic powder is applied on a surface of the additively manufactured object and fired, a coating layer that has been made porous suitably can be obtained.

The shape (outer shape) of the first to third ceramic powders is not limited in particular. The shape may be spherical or non-spherical, for example, elliptical, granular, or rectangular (for instance, ground shape). From the viewpoints of mechanical strength and easy manufacturing, for example, a ceramic powder with a substantially spherical shape can be preferably used. For example, the aspect ratio of the first to third ceramic powders is preferably close to 1 and, for example, is preferably 1.3 or less and more preferably 1.2 or less.

Note that the aspect ratio in the present specification is the value obtained as (a/b) in which a represents a long side of a minimum rectangle that circumscribes the first to third ceramic powders and b is a short side thereof.

The material and property of the first to third ceramic powders are not limited in particular. For example, the first to third ceramic powders may be formed by any of an inorganic particle and an organic-inorganic composite particle. A ceramic particle of the first to third ceramic powders is preferably an inorganic particle and particularly preferably a particle formed of a metal or metalloid compound. Examples of the suitable ceramic particles include ceramic particles containing, as a main component, oxide-based ceramics including oxides of elements that belong to Group 1 to Group 14 (for example, Group 4 to Group 14) in the periodic table, non-oxide-based ceramics including nitrides, carbides, borides, silicides, phosphates, and the like of various kinds of metal elements, and composite ceramics of these. In particular, the ceramic particles containing, as a main component, oxides, nitrides, carbides, or the like containing a metal element or a metalloid element selected from Al, Zr, Mg, and Si are preferable. Alternatively, the ceramic particles containing, as a main component, metal including any element that belongs to Group 1 to Group 13 (for example, Group 4 to Group 13) in the periodic table or an alloy thereof may be used.

Specific examples include: oxide-based ceramics such as alumina ($Al_2O_3$), zirconia ($ZrO_2$), magnesia (MgO), silica ($SiO_2$), titania ($TiO_2$), ceria ($CeO_2$), yttria ($Y_2O_3$), hafnia ($HfO_2$), barium titanate ($BaTiO_3$), manganese dioxide ($MnO_2$), lime (CaO), zinc oxide (ZnO), red oxide ($Fe_2O_3$), zircon ($ZrSiO_4$), mullite ($A_{16}O_{13}Si_2$), aluminum silicate, strontium oxide (SrO), barium oxide (BaO), and niobium oxide ($Nb_2O_5$); non-oxide-based ceramics such as silicon nitride ($Si_3N_4$), boron nitride (BN), aluminum nitride (AlN), silicon carbide (SiC), and boron carbonitride; composite materials including at least one kind of these ceramics; and the like. Any of these ceramics can be used alone or two or more kinds thereof can be used in combination in accordance with the application, required characteristics, and the like of the ceramic core. In particular, silica, alumina, zirconia, magnesia, and the like are preferable because of being superior in fire resistance. Note that the chemical formula shown in the parenthesis after the name of the material expresses the representative composition of that material and is not intended to limit the composition of the actual ceramics to that shown by the chemical formula.

The first ceramic powder is a material to form the central part. Specific examples of the particles that can be employed preferably as the first ceramic powder include a silica particle, an alumina particle, a zircon particle, and a magnesia particle. Any of these particles can be used alone, or two or more kinds thereof can be used in combination.

Note that the content of the first ceramic powder in the central part is not limited in particular and when the entire quantity of the central part is 100 parts by mass, the content of the first ceramic powder in the central part is usually 60 parts by mass or more, and from the viewpoint of improving the mechanical strength, preferably 65 parts by mass or more, more preferably 75 parts by mass or more, for example 80 parts by mass or more, and typically 90 parts by mass or more. The upper limit of the content of the first ceramic powder is not limited in particular, and the content of the first ceramic powder is preferably 99 parts by mass or less, more preferably 98 parts by mass or less, and for example 96 parts by mass or less. With the first ceramic powder contained in this range, the effect of the present structure can be achieved at a higher level.

The second ceramic powder is a material to form the first layer. Specific examples of the particles that can be employed preferably as the second ceramic powder include a silica particle. The use of silica as the ceramic component is preferable because, for example, when the additively manufactured ceramic core is used as a core, the dissolution by an alkaline solution after the casting can occur easily and in a short time (that is to say, excellent solubility is provided). Furthermore, silica is preferable also because silica whose particle size is controlled more precisely can be obtained easily at a relatively low cost.

The third ceramic powder is a material to form the second layer. Specific examples of the particles that can be employed preferably as the third ceramic powder include a silica particle, an alumina particle, a zircon particle, and a magnesia particle. Any of these particles can be used alone, or two or more kinds thereof can be used in combination.

A manufacturing method for the additively manufactured ceramic core disclosed herein is not limited in particular and, for example, the additively manufactured ceramic core can be suitably manufactured by a manufacturing method to be described below. That is to say, the manufacturing method for the additively manufactured ceramic core includes the following steps:

(1) preparing the central part (additively manufactured fired body) formed by manufacturing and firing the first ceramic powder in accordance with an additive manufacturing method;

(2) forming the first layer by immersing the central part (additively manufactured fired body) in a ceramic sol including the second ceramic powder and removing a dispersion medium by drying and heating; and (3) forming the second layer by coating a surface layer of the first layer with a ceramic slurry including the third ceramic powder and removing a solvent by high-temperature firing.

(1) Preparing the Central Part

The central part of the additively manufactured ceramic core disclosed herein is prepared by an aspect including the following method, for example. A powder for additively manufacturing including the first ceramic powder is prepared and by using this powder for additively manufacturing, the additively manufactured object is manufactured in accordance with a conventionally known method. The powder body for additively manufacturing may include a component other than the first ceramic powder as necessary. Examples of such a component include a binder, a surfactant, and the like. Examples of the binder include thermoplastic resins such as isobutylene resin, polyamide resin, polyester resin, polyether resin, polyvinyl alcohol resin, polyvinyl butyral resin, and polyethylene glycol resin, thermosetting resins such as melamine resin, and polysaccharides such as a cellulose derivative.

In order to improve the mechanical strength of the additively manufactured object, the additively manufactured object may be immersed in a solution including a compound to be made into ceramics by chemical reaction or heating. Examples of the compound to be made into ceramics by chemical reaction or heating include a coupling agent formed by any of a silane-based coupling agent containing silicon (Si), an aluminum-based coupling agent containing aluminum (Al), a titanium-based coupling agent containing titanium (Ti), and a zirconium-based coupling agent containing zirconia (Zr), and a metal alkoxide formed by any of a silane-based alkoxide containing silicon (Si), an aluminum-based alkoxide containing aluminum (Al), a titanium-based alkoxide containing titanium (Ti), and zirconium alkoxide containing zirconia (Zr).

Preparing the central part may include firing the additively manufactured object. For example, the manufactured additively manufactured object may be fired at a predetermined firing temperature (for example, 1000° C. to 1500° C.). Since the above manufacturing method and firing method do not characterize the present invention, the detailed description is omitted.

The average erosion rate of the prepared central part is required to be higher than that of the first layer. In a preferred aspect, the average erosion rate of the central part may be for example 30 µm/g or more and 80 µm/g or less with a predetermined projection output value. The predetermined projection output value is the value at which the erosion rate of an MSE standard test piece (HRC-45 manufactured by Palmeso Co., Ltd.) becomes 0.18 µm/g when 3-µm spherical alumina (MSE-BA-3-3 manufactured by Palmeso Co., Ltd.) is projected to the MSE standard test piece. The average erosion rate of the central part may be for example 40 µm/g or more and 50 µm/g or more. The average pore diameter of the central part may be for example 1 µm or more and 30 µm or less. The average pore diameter may be for example 5 µm or more and 10 µm or more. The porosity of the central part may be for example 30% or more and 60% or less. The porosity may be 35% or more and 40% or more. The arithmetic surface roughness Ra of the central part may satisfy for example 10 µm or more and for example 12 µm or more. The additively manufactured fired body with such a high erosion rate is advantageous in terms of collapsibility; however, there is still room for improvement in terms of strength. As for the surface roughness, moreover, there is still room for improvement in order to make the metal casting have a smooth surface. Thus, the effect by applying the first layer and the second layer in the present structure can be exerted more suitably.

In the present specification, the term "average pore diameter" corresponds to the value measured using mercury intrusion porosimetry unless otherwise stated. The term "porosity" corresponds to the value calculated based on the quantity of pores measured using mercury intrusion porosimetry.

(2) Forming the First Layer

The dispersion liquid (ceramic sol) in which the second ceramic powder is dispersed in the dispersion medium is prepared. Through the mode of such a ceramic sol, the second ceramic powder can be introduced suitably into the pores of the central part. Note that this ceramic sol is in a colloidal state (that is, colloidal solution) in which the second ceramic powder is not aggregated and floats or suspends uniformly in the dispersion medium independently. The colloidal solution is the term encompassing the sol, the suspension, and the like.

Since the composition, the property, and the like of the second ceramic powder are already described above in detail, the description is omitted. The second ceramic powder is dispersed in the suitable dispersion medium. The dispersion medium is not limited in particular and may be either an aqueous solvent or a nonaqueous solvent. The aqueous solvent is preferably water or a mixed solvent containing water. As the solvent, other than water, that forms the mixed solvent may be one kind or two or more kinds suitably selected from organic solvents that can be mixed uniformly with water (lower alcohol, lower ketones, and the like). For example, the aqueous solvent containing 80 mass % or more (more preferably 90 mass % or more and still more preferably 95 mass % or more) of water in the aqueous solvent is preferably used. A particularly preferable example is the aqueous solvent substantially consisting of water (for example, water). If necessary, the dispersion liquid may contain an additive (stabilizer) such as a dispersant or a thickener.

In order to suitably introduce the second ceramic powder into the pores in the central part, the mixing quantity (concentration) of the second ceramic powder in the ceramic sol is preferably adjusted to be for example about 10 wt % or more and 40 wt % or less. For example, the ceramic sol in which the second ceramic powder is dispersed may be prepared by causing a reaction between a predetermined metal salt or the like and dilute hydrochloric acid and dialysis or may be prepared by purchasing a commercial one.

Next, the central part manufactured as above is immersed in the ceramic sol, so that the pores in the central part are impregnated with the ceramic sol and the second ceramic powder is introduced into the pores of the central part. The immersion of the central part in the ceramic sol can be carried out for about 1 minute to 1 hour, for example, although the time depends on the mode of the pores formed in the central part, the concentration and viscosity of the ceramic sol, and the like.

By removing the dispersion medium from the additively manufactured object after the immersion, the first layer disclosed herein can be obtained. The dispersion medium can be removed by drying and heating. The drying can be performed by, for example, natural drying or air blowing. The heating can be performed by keeping in the air atmosphere for 1 to 3 hours at 400 to 500° C., for example. Thus, the first layer can be formed on at least a part of the central part. Note that the step of performing the immersion in the ceramic sol and the drying and heating may be repeated a plurality of times to form the first layer.

The average erosion rate of the first layer of the ceramic core prepared as above and including the central part and the first layer is required to be lower than those of the central part and the second layer. In a preferred aspect, the average erosion rate of the first layer may be for example 3 µm/g or more and 16 µm/g or less with the projection output value a predetermined projection output value. The predetermined projection output value is the value at which the erosion rate of an MSE standard test piece (HRC-45 manufactured by Palmeso Co., Ltd.) becomes 0.18 µm/g when 3-µm spherical alumina (MSE-BA-3-3 manufactured by Palmeso Co., Ltd.) is projected to the MSE standard test piece. The average erosion rate of the first layer is for example 13 μm/g or less, and more preferably 10 μm/g or less. The average pore diameter of the additively manufactured ceramic core including the central part and the first layer may be for example 1 μm or more and 30 μm or less. The average pore diameter may be, for example, 5 μm or more and 10 μm or more. The porosity of the additively manufactured ceramic core including the central part and the first layer may be for example 10% or more and 40% or less. For example, the porosity is preferably 35% or less and typically 30% or less. The arithmetic surface roughness Ra of the additively manufactured ceramic core including the central part and the first layer may satisfy for example 10 μm or more and typically 12 μm or more. Thus, by forming the first layer with the low erosion rate (that is, high mechanical strength) on at least a part of the central part, the additively manufactured ceramic core can achieve both the suitable collapsibility and strength. Regarding the surface roughness, however, there is still room for improvement. Therefore, the effect of additionally providing the second layer on the surface layer of the first layer can be exerted.

(3) Forming the Second Layer

A ceramic slurry in which the third ceramic powder is dispersed in a solvent is prepared. Such a ceramic slurry is used to form a porous coating layer. Typically, the surface layer of the first layer is coated with the slurry and then fired; thus, the second layer that is porous is formed.

Since the composition, the property, and the like of the third ceramic powder are already described above in detail, the description is omitted. The solvent used for the ceramic slurry included in the second layer may be any solvent that can disperse the aforementioned third ceramic powder, without particular limitations. For example, the aqueous solvent can be used. The aqueous solvent is preferably water or a mixed solvent containing water. As the component of the solvent, other than water, that forms the mixed solvent may be one kind or two or more kinds suitably selected from organic solvents that can be mixed uniformly with water (lower alcohol, lower ketones, and the like). For example, the aqueous solvent containing 80 mass % or more (more preferably 90 mass % or more and still more preferably 95 mass % or more) of water in the aqueous solvent is preferably used. A particularly preferable example is the aqueous solvent substantially consisting of water. The solvent used for the ceramic slurry is not limited to the aqueous solvent and may be a nonaqueous solvent (organic solvent). Examples of the nonaqueous solvent include alcohols such as ethyl alcohol and isopropyl alcohol, and the like.

The ratio between the third ceramic powder and the solvent in the ceramic slurry (third ceramic powder:solvent) is not limited in particular and is preferably in the range of 1:5 to 5:1 and more preferably 1:4 to 4:1 on the mass basis. With the third ceramic powder and the solvent contained at the ratio in this range, the aforementioned effect of improving the strength can be exerted more suitably.

The ceramic slurry disclosed herein may include a dispersant. The dispersant is a component added for the purpose of dispersing the third ceramic powder stably in the slurry, and typically a surfactant. As the dispersant, polymer polycarboxylic acid or the like is given. The content of the dispersant in the ceramic slurry is not limited in particular and is usually suitably 0.1 mass % to 3 mass %.

The ceramic slurry disclosed herein may further contain a known additive such as a thickener, a corrosion inhibitor, an antiseptic agent, or an antifungal agent as necessary within the range not interrupting the effect of the present structure. The content of the additive may be set as appropriate in accordance with the purpose of the addition, and since the content of the additive does not characterize the present invention, the detailed description is omitted.

A preparing method for the ceramic slurry is not limited in particular. For example, the components included in the ceramic slurry may be mixed by a known mixing method. The mode of mixing these components is not limited in particular and, for example, these components may be mixed all at once or may be mixed in the suitably set order.

Here, in the case of firing the additively manufactured ceramic core after the second layer is provided, it is necessary to fire the additively manufactured object in a high-temperature range of 1000° C. or more (preferably 1200° C. or more). Therefore, as a firing jig used for firing the additively manufactured object (for example, joint sand), it is desirable to use a firing jig made of a metal compound with high heat resistance, such as alumina, mullite, cordierite, or silicon carbide. These firing jigs made of a metal compound, however, may react with the third ceramic powder included in the ceramic slurry in the firing temperature range of 1000° C. or more. The reaction between the third ceramic powder and the firing jig may cause the third ceramic powder and the firing jig to adhere together, in which case the ceramic core with favorable surface roughness may not be obtained when the fired body is extracted from the firing jig. In view of this, in the firing step, the reaction between the third ceramic powder in the ceramic slurry and the firing jig is desirably suppressed suitably. By such firing, the additively manufactured ceramic core including the central part, the first layer, and the second layer disclosed herein can be manufactured.

The average erosion rate of the second layer in the additively manufactured ceramic core including the central part, the first layer, and the second layer that is prepared as above is required to be higher than that of the first layer. In a preferred aspect, the average erosion rate of the second layer may be for example 20 μm/g or more and 60 μm/g or less with a predetermined projection output value. The predetermined projection output value is the value at which the erosion rate of an MSE standard test piece (HRC-45 manufactured by Palmeso Co., Ltd.) becomes 0.18 μm/g when 3-μm spherical alumina (MSE-BA-3-3 manufactured by Palmeso Co., Ltd.) is projected to the MSE standard test piece. The average erosion rate of the second layer is preferably 25 μm/g or more and more preferably 30 nm/g or more, for example. The average pore diameter of the additively manufactured ceramic core including the central part, the first layer, and the second layer may be for example 1 μm or more and 30 μm or less. The average pore diameter may be 5 μm or more and 10 μm or more, for example. The porosity of the additively manufactured ceramic core including the central part, the first layer, and the second layer may be for example 20% or more and 50% or less. The porosity of the second layer may be for example 25% or more and typically 30% or more. The arithmetic surface roughness Ra of the additively manufactured ceramic core including the central part, the first layer, and the second layer may satisfy for example 15 μm or less and typically 10 μm or less. The additively manufactured ceramic core may have the surface roughness enough to be used as a core when the metal casting is manufactured.

Example of the present invention is hereinafter described but the example is not intended to limit the present invention to the example below.

As the first ceramic powder, a mixed powder of silica, zircon, and alumina (average particle diameter D1: 34 μm) was prepared. The weight ratio of silica, zircon, and alumina was set to 75:23:2. The mixed powder and PVA as a binder (Kuraray Poval 205) were weighed at a mass ratio of 90:10, and mixed for 20 minutes in a dry mixer; thus, a powder for additive manufacturing was prepared. This powder for additive manufacturing was input into ProJet 460 Plus manufactured by 3D Systems, Inc. to manufacture an additively manufactured object with a substantially rectangular parallelepiped shape (8 mm wide×40 mm deep×6 mm thick). The additively manufactured object was dried for 16 hours at room temperature and then for another hour at 65° C. Next, a coupling liquid containing a coupling agent (3-aminopropyl triethoxysilane) was prepared and the obtained additively manufactured object was impregnated with the coupling liquid for one minute. The additively manufactured object was dried for one hour at room temperature and then for another hour at 65° C. The dried additively manufactured object was fired at 1250° C. in the joint sand made of alumina; thus, the central part (additively manufactured fired body) was obtained (Comparative Example 1).

Next, a silica sol (silica concentration 20 wt %, average particle diameter D2: 10 nm) was prepared as the ceramic sol including the second ceramic powder. The central part (additively manufactured fired body) was immersed in the silica sol for 25 minutes. The central part was dried for one hour at room temperature and then for another hour at 80° C. The drying was followed by heating at 450° C.; thus, the additively manufactured object including the central part and the first layer was obtained. The step of immersing the additively manufactured object in the silica sol and drying and heating the additively manufactured object was repeated four times. This is Comparative Example 2.

As the third ceramic powder, a mixed powder of silica, zircon, and alumina (average particle diameter D3: 6.7 μm) was prepared. The weight ratio of silica, zircon, and alumina was set to 75:23:2. The mixed powder, polymer polycarboxylic acid as the dispersant, and ethanol as the solvent were mixed to prepare a ceramic slurry. The slurry was applied by a dip coating method so as to coat a surface of the obtained additively manufactured object including the central part and the first layer described above (Comparative Example 2) and dried. The dried additively manufactured object was fired at 1300° C. in the joint sand made of alumina; thus, an additively manufactured ceramic core was obtained (Example 1).

<Observation of Surface with Scanning Electron Microscope>

Figure 2:
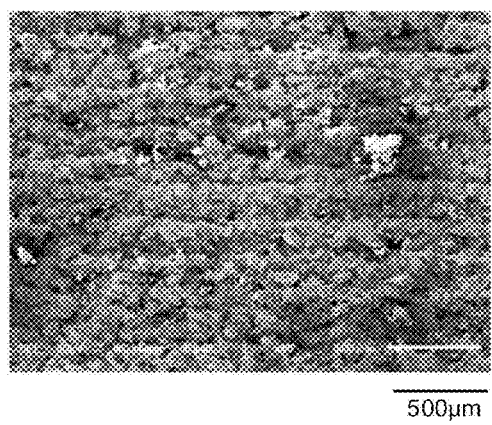
FIG. 2 shows a SEM observation image of a surface in Comparative Example 1.
Figure 3:
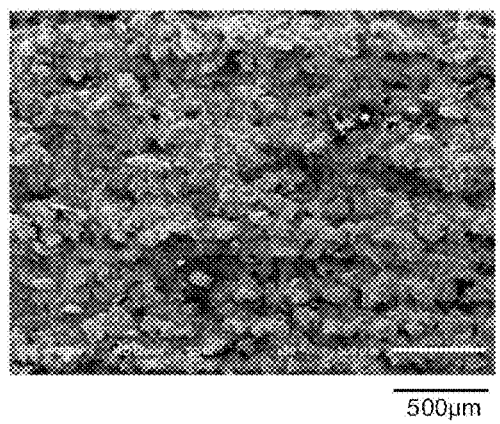
FIG. 3 shows a SEM observation image of a surface in Comparative Example 2.

Each surface in Example and Comparative Examples described above was observed using a scanning electron microscope (JSM-6610LA) manufactured by JEOL Ltd. A SEM observation image for each was acquired with an observation magnification of 50 times. FIG. 1 to FIG. 3 show examples of the SEM observation image, in which FIG. 1 shows the SEM observation image in Example 1, FIG. 2 shows the SEM observation image in Comparative Example 1, and FIG. 3 shows the SEM observation image in Comparative Example 2.

<Observation of Cross Section with Scanning Electron Microscope>

Figure 4:
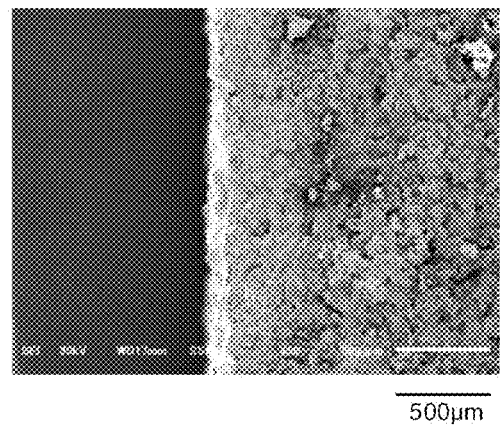
FIG. 4 shows a SEM observation image of a cross section perpendicular to the surface in Example 1 (cross section along thickness direction).
Figure 5:
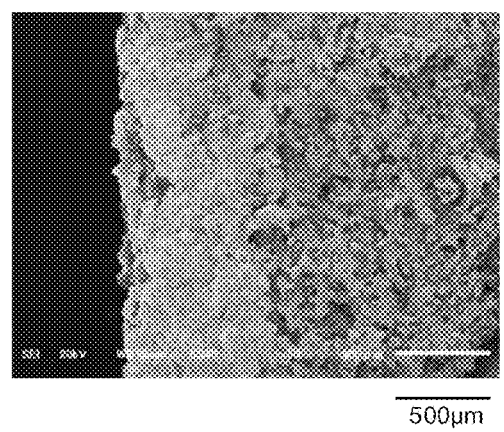
FIG. 5 shows a SEM observation image of a cross section perpendicular to the surface in Comparative Example 2 (cross section along thickness direction).

Regarding a cross section perpendicular to the surface (cross section along thickness direction) in Example 1 and Comparative Example 2, the SEM observation image was similarly acquired with an observation magnification of 50 times. FIG. 4 and FIG. 5 show examples of the SEM observation image, in which FIG. 4 shows the SEM observation image in Example 1 and FIG. 5 shows the SEM observation image in Comparative Example 2.

<Calculation of Average Erosion Rate>

A fragility test was conducted using MSE-A203 manufactured by Palmeso Co., Ltd. Three test pieces were prepared from each of Example 1 and Example 1 (cross section) in which the object in Example 1 was cut along the width direction at a position of 4 mm along the thickness direction. The fragility test was performed at a predetermined projection output value. The predetermined projection output value is the value at which the erosion rate of an MSE standard test piece (HRC-45 manufactured by Palmeso Co., Ltd.) becomes 0.18 μm/g when 3-μm spherical alumina (MSE-BA-3-3 manufactured by Palmeso Co., Ltd.) is projected to the MSE standard test piece. The projection particles were projected continuously from the surface (0 μm) to 180 μm in Example 1 and from the surface (0 μm) to 180 μm in Example 1 (cross section). The relation between the projection quantity (A g) of 3-μm spherical alumina and the erosion depth (B μm) was acquired at 3 to 20 places. Based on this value, the erosion rate was calculated from the expression: erosion rate (μm/g)=B/A.

The erosion rates were obtained from the calculation based on the values measured at positions in the range from the surface (0 μm) to 60 μm in Example 1 and the average value of the values was used as the average erosion rate of the second layer.

The erosion rates were obtained from the calculation at positions in the range of 100 μm to 180 μm from the surface in Example 1, and the average value of the values was used as the average erosion rate of the first layer.

The erosion rates were obtained from the calculation at positions in the range from the surface (0 μm) to 180 μm in Example 1 (cross section), and the average value of the values was used as the average erosion rate of the central part.

Note that the fragility test was carried out three times while the sample was varied under the similar condition, and the average value here is shown as the average erosion rate in Table 1.

<Evaluation on Surface Roughness Ra>

The surface roughness Ra of each surface in Example and Comparative Examples above was calculated. Regarding the surface roughness Ra, the arithmetic average roughness (μm) was calculated from a roughness curve when the cutoff value was 2.5 mm using SURFCOM manufactured by TOKYO SEIMITSU CO., LTD. in accordance with JIS B 0601: 1982 (see FIG. 6A to FIG. 6C). Note that the scanning distance of the surface property was 10 mm. The results are shown in Table 2.

<Three-Point Bending Strength>

Each three-point bending strength in Example and Comparative Examples above was measured. The three-point bending strength was measured using a three-point bending tester (EZ-TEST) manufactured by Shimadzu Corporation in accordance with JIS B 1601: 2008. The results are shown in Table 2.

<Porosity and Average Pore Diameter>

The porosity and the average pore diameter in Example and Comparative Examples described above were measured. The porosity and the average pore diameter were measured by mercury intrusion porosimetry using AutoPore V 9600 manufactured by Micromeritics Instrument Corporation. The results are shown in Table 2.

<Analysis of Si, Al, and Zr Element Distribution Status by EDX>

The energy dispersive X-ray spectroscopy (EDX) was performed using the aforementioned scanning electron microscope (JSM-6610LA) at a position of 0.15 mm (first layer), 1 mm (central part), and 4 mm (central part) from the surface of the cross section perpendicular to the surface in Example 1 (cross section along thickness direction). The results of the conversion in terms of the weight of the oxide are shown in Table 3.

As shown in FIG. 4, it has been confirmed that Example 1 included the central part, the first layer that covered at least a part of the central part, and the second layer formed on the surface layer of the first layer. It has also been confirmed that the second layer had the suitable porosity and covered the uneven lamination as observed in FIG. 3 and FIG. 5.

TABLE 1

|  | Average erosion rate (μm/g) in fragility test | Relative ratio based on first layer |
|---|---|---|
| Second layer (surface (0 μm) to 60 μm) | 36.2 | 4.9 |
| First layer (100 μm to 180 μm from surface) | 7.4 | — |
| Central part (4000 μm to 4180 μm from surface) | 54.1 | 7.3 |

As shown in Table 1, it has been confirmed that the average erosion rate of the first layer was lower than that of the central part and the average erosion rate of the second layer was higher than that of the first layer. In addition, the average erosion rates of the central part and the second layer were higher than that of the first layer and the average erosion rate of the central part was 5 times or more that of the first layer and the average erosion rate of the second layer was 2.5 times or more that of the first layer. With the additively manufactured ceramic core having such average erosion rates, both the strength and the collapsibility can be achieved.

TABLE 2

|  | Surface roughness Ra (μm) | Strength (MPa) | Porosity (%) | Average pore diameter (μm) |
|---|---|---|---|---|
| Example 1 (central part + first layer + second layer) | 7.7 | 8.3 | 34 | 14.4 |
| Comparative Example 1 (only central part) | 15.1 | 2.8 | 54 | 16.6 |
| Comparative Example 2 (central part + first layer) | 14.9 | 7.5 | 24 | 19.8 |

Figure 6A:
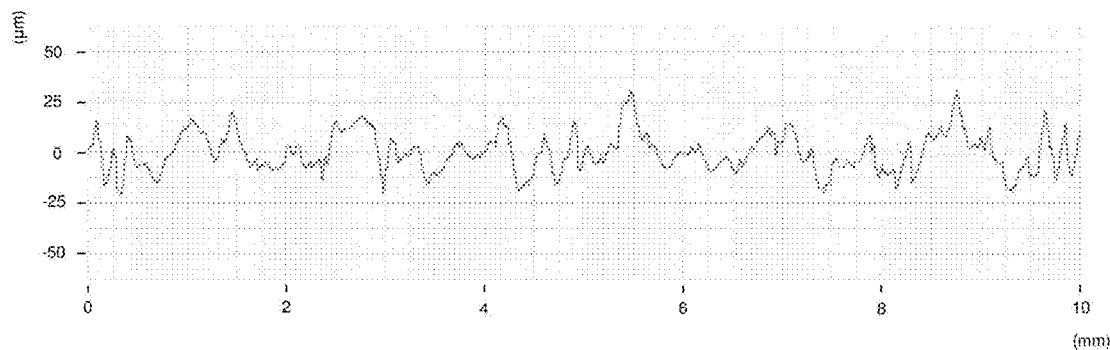
FIG. 6A is a graph expressing a result of measuring surface roughness Ra in Example 1.
Figure 6B:
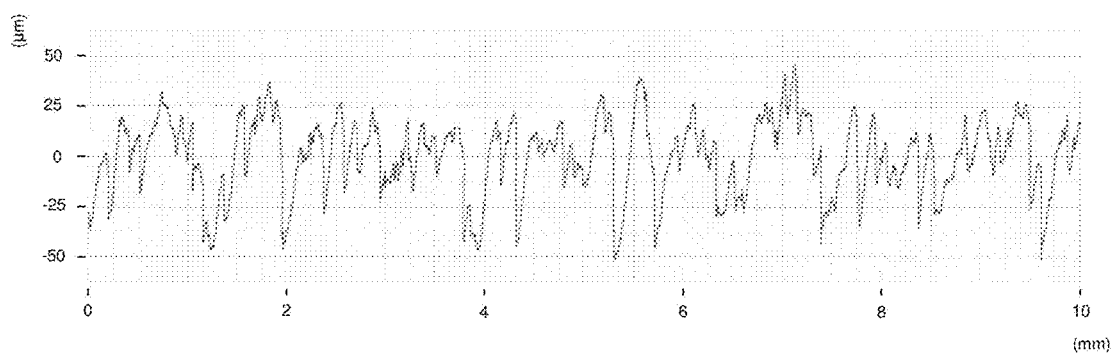
FIG. 6B is a graph expressing a result of measuring surface roughness Ra in Comparative Example 1.
Figure 6C:
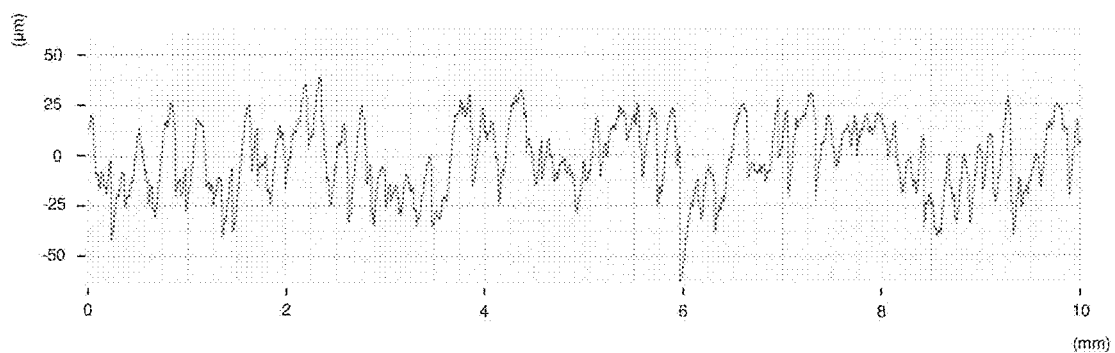
FIG. 6C is a graph expressing a result of measuring surface roughness Ra in Comparative Example 2.

As shown in Table 2 and FIG. 6A to FIG. 6C, the surface roughness Ra was 10 μm or less in Example 1, which was drastically improved compared to the surface roughness Ra in Comparative Examples 1 and 2. Moreover, as shown in Table 2, the strength in Example 1 and Comparative Example 2 was improved largely compared to that in Comparative Example 1. In Example 1 including the second layer, the strength was further improved compared to that in Comparative Example 2. That is to say, it has been confirmed that in Example 1 including the central part, the first layer, and the second layer, the surface roughness Ra was improved and the strength was improved compared to those in Comparative Example 1 including only the central part and Comparative Example 2 including the central part and the first layer.

TABLE 3

|  | $SiO_2$ (wt %) | $Al_2O_3$ (wt %) | $ZrO_2$ (wt %) |
|---|---|---|---|
| 0.15 mm from surface (first layer) | 91.6 | 1.5 | 6.9 |
| 1 mm from surface (central part) | 82.8 | 2 | 15.2 |
| 4 mm from surface (central part) | 80.5 | 2 | 17.5 |

As shown in Table 3 and FIG. 4, it has been confirmed that silica was present in a biased manner at a position 0.15 mm from the surface (first layer) in Example 1 compared to a position 1 mm from the surface (central part) and a position 4 mm from the surface (central part). With the first layer including silica in the biased manner, the additively manufactured ceramic core can exert the suitable meltability.

The specific embodiments have been described above in detail; however, these are examples and will not limit the scope of claims. The techniques described in the scope of claims include those in which the specific examples exemplified above are variously modified and changed.

The invention claimed is:

1. An additively manufactured ceramic core to be used as a core when manufacturing a metal casting, the additively manufactured ceramic core comprising a central part corresponding to an additively manufactured fired body of a predetermined ceramic powder, a first layer covering at least a part of the central part, and a second layer formed on a surface layer of the first layer, wherein when an average erosion rate corresponding to an average value of erosion rates calculated from an expression: erosion rate (μm/g) =B/A in which A g represents a projection quantity of projection particles and B um represents an erosion depth in a fragility test for the additively manufactured ceramic core is used, the average erosion rate of the first layer is lower than that of the central part and the average erosion rate of the second layer is higher than that of the first layer.

2. The additively manufactured ceramic core according to claim 1, wherein
the average erosion rate of the central part is 5 times or more that of the first layer, and
the average erosion rate of the second layer is 2.5 times or more that of the first layer.

3. The additively manufactured ceramic core according to claim 2, wherein the second layer has an arithmetic average surface roughness Ra of 10 μm or less.

4. The additively manufactured ceramic core according to claim 3, wherein each of the central part and the second layer includes at least one kind selected from the group consisting of silica, alumina, zircon, and magnesia.

5. The additively manufactured ceramic core according to claim 4, wherein the first layer contains silica as a main component.

6. The additively manufactured ceramic core according to claim 3, wherein the first layer contains silica as a main component.

7. The additively manufactured ceramic core according to claim 2, wherein each of the central part and the second layer includes at least one kind selected from the group consisting of silica, alumina, zircon, and magnesia.

8. The additively manufactured ceramic core according to claim 7, wherein the first layer contains silica as a main component.

9. The additively manufactured ceramic core according to claim 2, wherein the first layer contains silica as a main component.

10. The additively manufactured ceramic core according to claim 1, wherein the second layer has an arithmetic average surface roughness Ra of 10 μm or less.

11. The additively manufactured ceramic core according to claim 10, wherein each of the central part and the second layer includes at least one kind selected from the group consisting of silica, alumina, zircon, and magnesia.

12. The additively manufactured ceramic core according to claim 11, wherein the first layer contains silica as a main component.

13. The additively manufactured ceramic core according to claim 10, wherein the first layer contains silica as a main component.

14. The additively manufactured ceramic core according to claim 1, wherein each of the central part and the second layer includes at least one kind selected from the group consisting of silica, alumina, zircon, and magnesia.

15. The additively manufactured ceramic core according to claim 14, wherein the first layer contains silica as a main component.

16. The additively manufactured ceramic core according to claim 1, wherein the first layer contains silica as a main component.

* * * * *